US010935691B2

(12) United States Patent
Kang et al.

(10) Patent No.: US 10,935,691 B2
(45) Date of Patent: Mar. 2, 2021

(54) CT INSPECTION SYSTEM AND CT IMAGING METHOD FOR OBTAINING DETECTION DATA AT A FREQUENCY THAT IS N TIMES A BEAM-EMITTING FREQUENCY OF A RADIOACTIVE SOURCE DEVICE

(71) Applicants: TSINGHUA UNIVERSITY, Beijing (CN); NUCTECH COMPANY LIMITED, Beijing (CN)

(72) Inventors: Kejun Kang, Beijing (CN); Jianmin Li, Beijing (CN); Xiulin Ni, Beijing (CN); Yulan Li, Beijing (CN); Yuanjing Li, Beijing (CN); Zhiqiang Chen, Beijing (CN); Li Zhang, Beijing (CN); Liang Li, Beijing (CN); Xiang Zou, Beijing (CN); Weifeng Yu, Beijing (CN); Hejun Zhou, Beijing (CN); Chunguang Zong, Beijing (CN)

( * ) Notice: Subject to any disclaimer, the term of this patent is extended or adjusted under 35 U.S.C. 154(b) by 0 days.

(21) Appl. No.: 16/234,625

(22) Filed: Dec. 28, 2018

(65) Prior Publication Data

US 2019/0204243 A1   Jul. 4, 2019

(30) Foreign Application Priority Data

Dec. 28, 2017  (CN) .......................... 201711451912.0

(51) Int. Cl.
*G01V 5/00*      (2006.01)
*G01N 23/046*   (2018.01)

(52) U.S. Cl.
CPC ........... *G01V 5/005* (2013.01); *G01N 23/046* (2013.01); *G01N 2223/33* (2013.01)

(58) Field of Classification Search
CPC ........... A61B 6/032; A61B 6/035; A61B 6/42; A61B 6/4208; A61B 6/4233;
(Continued)

(56) References Cited

U.S. PATENT DOCUMENTS 6,233,308 B1 *  5/2001  Hsieh ..................... A61B 6/032
                                                                   378/19
6,269,140 B1 *  7/2001  Takagi ................... A61B 6/032
                                                                   378/8
(Continued)

FOREIGN PATENT DOCUMENTS

CN     101683271 A     3/2010
EP       0325656 A4    1/1989
(Continued)

OTHER PUBLICATIONS

EP Search Report dated May 23, 2019 in the corresponding EP application (application No. 19150074.3).
(Continued)

*Primary Examiner* — Allen C. Ho
(74) *Attorney, Agent, or Firm* — Kilpatrick Townsend & Stockton, LLP (57) ABSTRACT

The present disclosure relates to the technical field of CT detection, and in particular to a CT inspection system and a CT imaging method. The CT inspection system provided by the present disclosure comprises a radioactive source device, a detection device, a rotation monitoring device and an imaging device, wherein the detection device obtains detection data at a frequency that is N times a beam emitting frequency of the radioactive source device; the rotation monitoring device detects a rotation angle of the detection device and transmits a signal to the imaging device each time the detection device rotates by a preset angle; the imaging device determines a rotational position of the detection device each time the radioactive source device emits a beam according to the signal transmitted by the rotation monitoring device and the detection data of the detection device.

9 Claims, 2 Drawing Sheets

(58) Field of Classification Search
CPC ....... A61B 6/4283; A61B 6/44; A61B 6/4429; A61B 6/4435; A61B 6/4441; A61B 6/4447; A61B 6/54; A61B 6/542; A61B 6/544; A61B 6/545; G01N 23/046; G01N 23/18; G01V 5/005
USPC ... 378/15, 16, 19, 57, 58, 62, 91, 98.8, 189, 378/196, 197; 250/370.09
See application file for complete search history.

(56) References Cited

U.S. PATENT DOCUMENTS

| | | | | |
|---|---|---|---|---|
| 6,882,703 B2* | 4/2005 | Price | ................... | H01J 35/065 378/101 |
| 7,283,607 B2* | 10/2007 | Sommer | ................ | A61B 6/032 378/15 |
| 7,376,214 B2* | 5/2008 | Klingenbeck-Regn | ...................... | A61B 6/4441 378/8 |
| 7,724,866 B2* | 5/2010 | Naidu | .................. | G01T 1/2985 378/15 |
| 7,813,473 B2* | 10/2010 | Edic | ..................... | A61B 6/4028 378/8 |
| 7,817,773 B2* | 10/2010 | Stanton | ................... | A61B 6/466 378/15 |
| 7,881,426 B2* | 2/2011 | Basu | ....................... | A61B 6/027 378/15 |
| 7,936,858 B2* | 5/2011 | Hashemi | ................. | A61B 6/025 378/21 |
| 8,044,681 B2* | 10/2011 | Rao | ........................... | G06G 7/18 326/38 |
| 8,265,223 B2* | 9/2012 | Proksa | ..................... | G01T 1/17 378/9 |
| 8,451,972 B2* | 5/2013 | Dafni | ..................... | A61B 6/032 378/11 |
| 8,489,175 B2* | 7/2013 | Schönborn | ........... | A61B 6/4441 378/11 |
| 8,971,996 B2* | 3/2015 | Flohr | .................... | A61B 5/0456 378/62 |
| 8,983,026 B2* | 3/2015 | Ishiyama | ............... | A61B 6/482 378/16 |
| 9,259,196 B2* | 2/2016 | Müller | ...................... | A61B 6/14 |
| 9,274,037 B2* | 3/2016 | Huwer | ................... | A61B 6/505 |
| 9,417,339 B2* | 8/2016 | Spahn | ................... | A61B 6/4241 |
| 9,420,974 B2* | 8/2016 | Ye | ........................ | A61B 6/5235 |
| 9,538,107 B2* | 1/2017 | Chappo | ................. | A61B 6/032 |
| 9,538,966 B2* | 1/2017 | Müller | ................... | A61B 6/5229 |
| 9,538,976 B2* | 1/2017 | Keall | ..................... | A61B 6/541 |
| 9,538,978 B2* | 1/2017 | Makino | ................. | G16H 40/63 |
| 9,664,587 B2* | 5/2017 | Lou | ...................... | G01N 23/046 |
| 9,724,061 B2* | 8/2017 | Hyung | ................... | A61B 6/482 |
| 9,836,830 B2* | 12/2017 | Naito | ................... | G01N 23/046 |
| 9,848,835 B2* | 12/2017 | Berkus | ................... | A61B 6/541 |
| 9,880,111 B2* | 1/2018 | Oda | ....................... | H04N 5/32 |
| 10,064,584 B2* | 9/2018 | Yared | ..................... | A61B 6/508 |
| 10,111,639 B2* | 10/2018 | Karahashi | ............. | A61B 6/54 |
| 10,201,322 B2* | 2/2019 | Xing | ..................... | A61B 6/032 |
| 10,206,647 B2* | 2/2019 | Hiroshige | ............ | A61B 6/4233 |
| 10,281,592 B2* | 5/2019 | Kawata | .................. | G01T 1/17 |
| 10,307,127 B2* | 6/2019 | Bernhardt | ............. | A61N 5/1049 |
| 10,368,824 B2* | 8/2019 | Yamakawa | ........... | A61B 6/461 |
| 10,470,727 B2* | 11/2019 | Ota | ....................... | G01T 7/00 |
| 10,537,297 B2* | 1/2020 | Hagiwara | ............... | A61B 6/00 |
| 10,542,950 B2* | 1/2020 | Ishii | ...................... | G06T 7/0012 |
| 10,561,391 B2* | 2/2020 | Nett | ....................... | A61B 6/032 |
| 10,568,595 B2* | 2/2020 | Hosoki | .................. | A61B 6/4233 |
| 2006/0140333 A1 | 6/2006 | Sommer | | |
| 2009/0003515 A1 | 1/2009 | Naidu et al. | | |
| 2010/0215144 A1 | 8/2010 | Basu et al. | | |

FOREIGN PATENT DOCUMENTS

| | | | | |
|---|---|---|---|---|
| EP | 0325656 B1 * | 2/1993 | ............... | A61B 6/03 |
| EP | 2990834 A1 | 3/2016 | | |

OTHER PUBLICATIONS

EP first office action dated May 28, 2020 in corresponding EP application (application No. 19150074.3).

* cited by examiner

CT INSPECTION SYSTEM AND CT IMAGING METHOD FOR OBTAINING DETECTION DATA AT A FREQUENCY THAT IS N TIMES A BEAM-EMITTING FREQUENCY OF A RADIOACTIVE SOURCE DEVICE

CROSS-REFERENCES TO RELATED APPLICATIONS

The present disclosure claims the priority of Chinese Application No. 201711451912.0, filed in the Chinese Patent Office on Dec. 28, 2017, whose entire contents are herein incorporated by reference.

FIELD

The present disclosure relates to the technical field of CT detection, and in particular to a CT inspection system and a CT imaging method

BACKGROUND

Except for applications in the medical field, a CT inspection system is also widely applied in the technical field of object detection, and the CT inspection system can detect not only such smaller objects as luggage and flight cases, but also such bigger objects as containers and vehicles. When working, the CT inspection system scans an object to be detected via a radiation source which is configured to generate high-energy X rays and a detection device which is configured to receive X rays penetrating through the object to be detected. The CT inspection system reflects density distribution changes of the object to be detected according to strength changes of X rays, and transforms strength changes of rays into image grayscales to obtain a perspective image of the object to be detected.

At present, the radiation source and detection device of the CT inspection system usually rotate during scanning the object to be detected. Furthermore, acceleration usually exits in the rotating process, that is, the radiation source and the detection device usually rotate at a non-uniform speed during the scanning process. Based on this current conventional image collection solution, a reconstructed CT image is deformed, which influences the accuracy of detection results.

SUMMARY

One technical problem to be solved in the present disclosure is as follows: the CT image reconstructed by the existing CT inspection system which rotates at a non-uniform speed when scanning an object to be detected is deformed, and the accuracy of detection results is poor.

In order to solve the above technical problem, a first aspect of the present disclosure provides a CT inspection system, comprising a radioactive source device;

a detection device synchronously rotating with the radioactive source device at a nonuniform speed in at least partial process of scanning an object to be inspected, for obtaining detection data at a frequency that is N times a beam emitting frequency of the radioactive source device, wherein N is greater than or equal to 2;

a rotation monitoring device, for detecting a rotation angle of the detection device and transmitting a signal to an imaging device each time the detection device rotates by a preset angle; and an imaging device, for determining rotational position of the detection device each time the radioactive source device emits a beam based on both the signals transmitted by the rotation monitoring device and the detection data of the detection device, and generating a CT image based on the detection data and the rotational position of the detection device each time the radioactive source device emits a beam.

According to some embodiments of the disclosure, the imaging device determines the rotational position of the detection device each time the radioactive source device emits a beam based on the signal transmitted by the rotation monitoring device, the detection data of the detection device, and beam emitting information of the radioactive source device.

According to some embodiments of the disclosure, the imaging device comprises an information processing device and an image processing device, wherein the information processing device is configured to receive the signal transmitted by the rotation monitoring device and the detection data of the detection device and determine rotational position of the detection device each time the radioactive source device emits a beam based on the signal transmitted by the rotation monitoring device and the detection data of the detection device, and the image processing device is configured to generate a CT image based on the detection data and the rotational position of the detection device each time the radioactive source device emits a beam.

According to some embodiments of the disclosure, the information processing device is configured to obtain beam emitting information of the radioactive source device, and the rotational position of the detection device each time the radioactive source device emits a beam is determined by the information processing device based on the signal transmitted by the rotation monitoring device, the detection data of the detection device, and the beam emitting information of the radioactive source device.

According to some embodiments of the disclosure, the imaging device is configured to determine the rotational position of the detection device each time the radioactive source device emits a beam according to the detection data of the detection device between every two adjacent signals transmitted by the rotation monitoring device.

According to some embodiments of the disclosure, the CT inspection system further comprises a frequency multiplying device, which multiplies the beam emitting frequency of the radioactive source device by N times, and the detection device obtains the detection data based on a frequency multiplied by the frequency multiplying device, so that the detection device obtains the detection data at a frequency that is N times the beam emitting frequency of the radioactive source device.

According to some embodiments of the disclosure, the rotation monitoring device comprises a position detecting device, which detects a rotation angle of the detection device in a scanning process, and according to a detection result of the position detecting device, the rotation monitoring device transmits a signal to the imaging device each time the detection device rotates by the preset angle.

According to some embodiments of the disclosure, the rotation monitoring device further comprises a rotation control device, which is configured to transmit a signal to the imaging device each time the detection device rotates by the preset angle according to the detection result of the position detecting device.

According to some embodiments of the disclosure, the rotation control device is further configured to control at least one of rotational speeds of the radioactive source device and the detection device, and beam emitting of the radioactive source device.

A second aspect of the present disclosure also provides a CT imaging method, comprising the steps as follows:

scanning an object to be inspected by a radioactive source device and a detection device of a scanning device, wherein the radioactive source device and the detection device synchronously rotate at a non-uniform speed in at least partial scanning process, and the detection device obtains detection data at a frequency that is N times a beam emitting frequency of the radioactive source device, wherein N is greater than or equal to 2;

detecting a rotation angle of the detection device by a rotation monitoring device, and transmitting a signal to an imaging device each time the detection device rotates by a preset angle by the rotation monitoring device;

determining rotational position of the detection device by the imaging device each time the radioactive source device emits a beam according to the signals transmitted by the rotation monitoring device and the detection data of the detection device, and generating a CT image by the imaging device based on the detection data and the rotational position of the detection device each time the radioactive source device emits a beam.

Under the cooperation of the radioactive source device, the detection device, the rotation monitoring device and the imaging device, the CT inspection system provided by the present disclosure is capable of determining the rotational position of the detection device each time the radioactive source device accurately emits a beam, so that it is possible to effectively reduce the image deformation and improve the accuracy of detection results compared with the traditional image acquisition solution.

Other features of the present disclosure and advantages thereof will become explicit by means of the following detailed descriptions of exemplary embodiments of the present disclosure with reference to the drawings.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For those skilled in the art, they may also acquire other drawings according to such drawings on the premise that no inventive effort is involved.

DETAILED DESCRIPTION OF THE INVENTION

Next, the technical solution in the embodiments of the present disclosure will be explicitly and completely described in combination with the accompanying drawings in the embodiments of the present disclosure. Apparently, the described embodiments are merely part of the embodiments of the present disclosure, rather than all the embodiments. The following descriptions of at least one exemplary embodiment which are in fact merely illustrative, by no means serve as any delimitation on the present disclosure as well as its application or use. On the basis of the embodiments of the present disclosure, all the other embodiments acquired by a person skilled in the art on the premise that no inventive effort is involved fall into the protection scope of the present disclosure.

The techniques, methods, and apparatuses known to a common technical person In the relevant art may not be discussed in detail, but where appropriate, techniques, methods, and apparatuses should be considered as part of the granted description.

When the imaging device reconstructs an image, the positions where the data of the detection device is acquired need to be known. However, the imaging device of the existing CT inspection system can only determine the position of the detection data acquired each time according to a rotation speed and an initial position when the scanning device rotates at an uniform speed, but cannot effectively determine a corresponding relationship between the acquired data of the detection device and an actual position when the rotation speed of the scanning device is changeful, as a result, a CT reconstructed image is deformed, recognition difficulty is increased, and even the image cannot be recognized.

Figure 1:
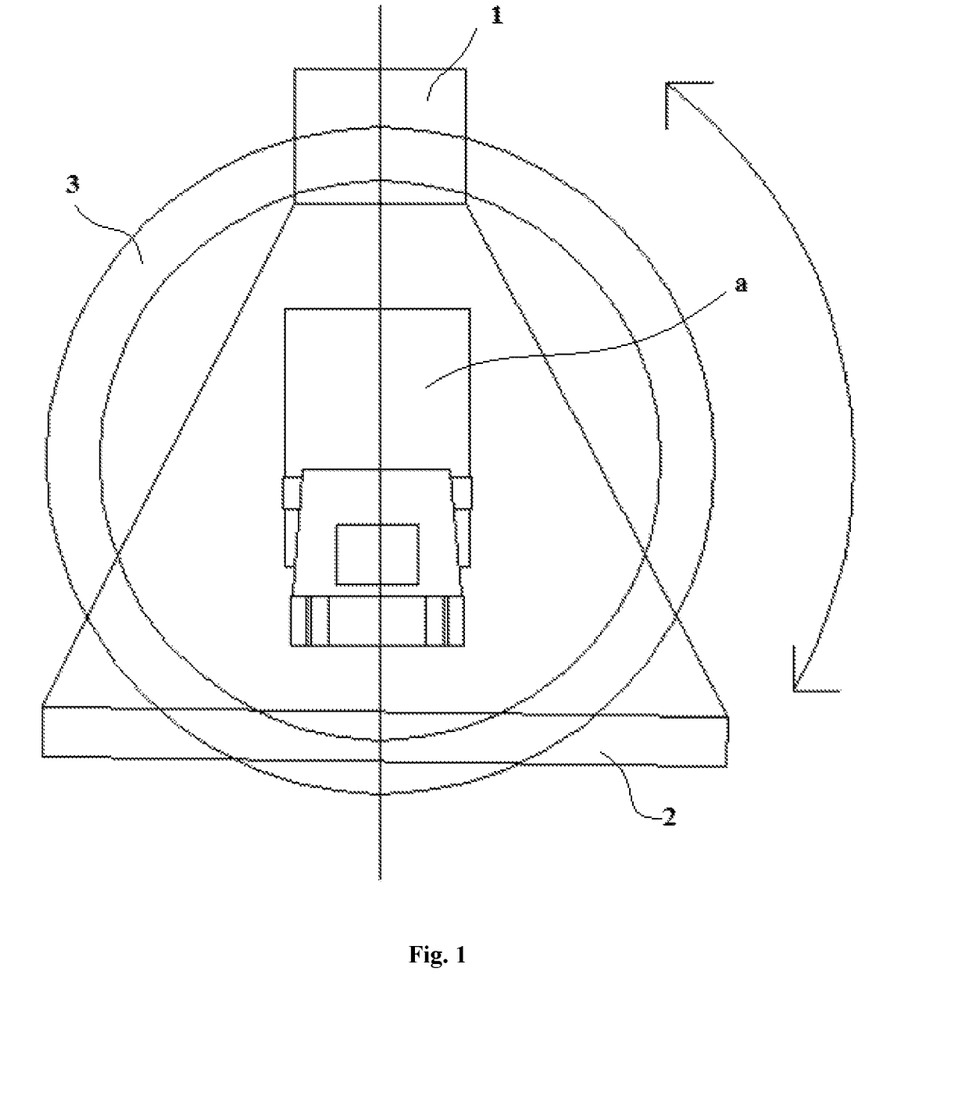
FIG. 1 is a schematic view showing the structure of the CT inspection system according to one embodiment of the present disclosure.
Figure 2:
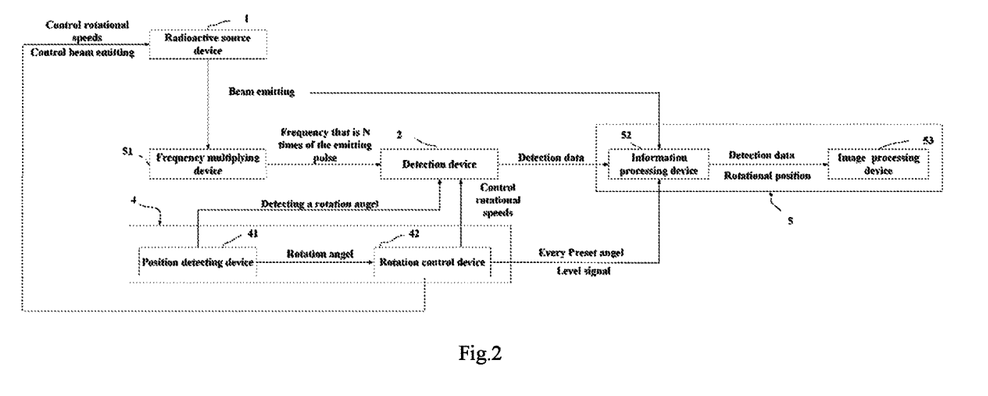
FIG. 2 is a diagram showing the image generation principle of the CT inspection system shown in FIG. 1.

In order to solve the above technical problem, the present disclosure provides a CT inspection system, an embodiment of which is shown in FIG. 1 and FIG. 2.

With reference to FIG. 1 and FIG. 2, the CT inspection system provided by the present disclosure comprises a radioactive source device 1, a detection device 2, a rotation monitoring device 4 and an imaging device 5, wherein the radioactive source device 1 and the detection device 2 are configured to synchronously rotate at a non-uniform speed in at least partial process of scanning an object a to be inspected; the detection device 2 is for obtaining detection data at a frequency that is N times a beam emitting frequency of the radioactive source device 1, wherein N is greater than or equal to 2; the rotation monitoring device 4 is for detecting a rotation angle of the detection device 2 and transmitting a signal to the imaging device 5 each time the detection device 2 rotates by a preset angle; and the imaging device 5 is for determining rotational position of the detection device 2 each time the radioactive source device 1 emits a beam according to the signal transmitted by the rotation monitoring device 4 and the detection data of the detection device 2, and generating a CT image based on the detection data and the rotational position of the detection device 2 each time the radioactive source device 1 emits a beam.

In the present disclosure, the detection device 2 of the CT inspection system obtains the detection data no longer at the same frequency as the radioactive source device 1, but at a frequency that is N times the beam emitting frequency of the radioactive source device 1. Moreover, in the CT inspection system, a rotation monitoring device 4 is provided to transmit a signal to the imaging device 5 each time the detection device 2 rotates by a preset angle. In this way, the imaging device 5 can very accurately acquire an actual rotational position of the detection device 2 each time the radioactive source device 1 emits a beam based on the detection data and the signal transmitted by the rotation monitoring device 4, so that the imaging device 5 can be not influenced by a non-uniform rotation scanning process to reconstruct a CT image with no deformation, thereby further reducing the recognition difficulty and improving the accuracy of detection results.

As described previously, when the imaging device 5 reconstructs an image, it is necessary to know the specific position at which the detection data is acquired by the detection device, however, in the rotary scanning process at a non-uniform speed, the existing CT inspection system cannot effectively determine the actual rotational position of the detection device 2 when the radioactive source device 1 emits a beam, so that image deformation may be caused. Although compared with the case without a rotation monitoring device 4, when a rotation monitoring device 4 is separately provided to detect the rotation angle of the detection device 2, the actual rotational position of the detection device 2 when the radioactive source device 1 emits a beam may be roughly determined, and the image deformation is reduced to certain extent, yet due to the limitation of the reasons such as the detection accuracy of the rotation monitoring device 4, the radioactive source device 1 may not coincidentally emit a beam each time the detection device 2 rotates by the preset angle, that is, the angular position corresponding to each signal transmitted by the rotation monitoring device 4 may not coincidentally be the actual angular position where the detection data is obtained by the detection device 2 when the radiation source device 1 emits a beam (referred to as effective detection data for short). Therefore, the actual rotational position of the detection device 2 each time the radiation source device 1 emits a beam may not be accurately acquired only on the basis of the signal of the rotation monitoring device 4, which may still lead to the image deformation problem.

For example, the time that the radioactive source device 1 emits a ray (i.e., emitting a beam) and the detection device 2 actually obtains the effective detection data may be coincidentally before or after the rotation monitoring device 4 transmits a signal, namely, the detection device 2 obtains the effective detection data probably when the detection device 2 rotates to the angular position between two adjacent signals transmitted by the rotation monitoring device 4. In this case, if the angular position when the rotation monitoring device 4 transmits a signal is still directly taken as the actual position at which the detection device 2 obtains the effective detection data, it is apparent that there is an error, thus affecting the authenticity of the image.

In the present disclosure, not only a rotation monitoring device 4 is added in the CT inspection system, but also the detection device 2 of the CT inspection system is configured to no longer obtain the detection data at the same frequency as the radioactive source device 1, but obtain the detection data at a frequency that is N times the beam emitting frequency, so that each time when the radioactive source device 1 emits a beam, the detection device 2 is capable of no longer obtaining only one group of detection data, but N groups of detection data, which includes the effective detection data when the radioactive source device 1 emits a beam and the ineffective detection data when the radioactive source device 1 does not actually emit a beam. With the increased detection data, each signal transmitted by the rotation monitoring device 4 each time the detection device rotates by the preset angle corresponds to more detection data, so that multiple groups of detection data can divide the preset angle by which the detection device 2 rotates each time into multiple parts, and even when there is sufficient detection data, i.e. the amount of N is large enough, it may be considered that these multiple groups of detection data make an equipartition of the preset angle by which the detection device 2 rotates each time. This facilitates the imaging device 5 to more accurately determine the actual rotational position of the detection device 2 each time when the radioactive source device 1 emits a beam, and improves the determination accuracy of the detection device 2 each time when the radioactive source device 1 emits a beam, without being constrained by actual conditions such as the detection accuracy of the rotation monitoring device 4 any longer.

For example, in the present disclosure, the imaging device 5 may determine the rotational position of the detection device 2 each time when the radioactive source device 1 emits a beam according to the detection data of the detection device 2 between every two adjacent signals transmitted by the rotation monitoring device 4. As described previously, it is possible that when obtaining the effective detection data the detection device 2 coincidentally rotates to a certain angular position between two adjacent signals transmitted by the rotation monitoring device 4, thus, the rotational position of the detection device 2 each time the radioactive source device 1 emits a beam can be more accurately determined by the imaging device 5 according to the detection data of the detection device 2 between every two adjacent signals transmitted by the rotation monitoring device 4. Wherein, since the detection device 2 obtains N groups of detection data each time when a beam is emitted, between every two transmitted adjacent signals of the rotation monitoring device 4, exist not only one group of detection data, but multiple groups of detection data, and these multiple groups of detection data may subdivide the rotation angle between the two adjacent angle signals (i.e., the preset rotation angle), so that the angular position corresponding to the effective detection data is of higher accuracy. Thus, the error of the actual rotational position of the detection device 2 each time the radioactive source device 1 emits a beam can be lowered, and the actual space position of the detection device 2 each time the effective detection data is obtained can be more accurately determined, thereby more effectively reducing the image deformation and improving the accuracy of the detection results.

As one embodiment of the imaging device 5 of the present disclosure, the imaging device 5 may comprise an information processing device 52 and an image processing device 53, wherein the information processing device 52 is configured to receive the signal transmitted by the rotation monitoring device 4 and the detection data of the detection device 2, and determine the rotational position of the detection device 2 each time the radioactive source device 1 emits a beam based on the signal transmitted by the rotation monitoring device 4 and the detection data of the detection device 2; and the image processing device 53 is configured to generate a CT image based on the detection data and the rotational position of the detection device 2 each time the radioactive source device 1 emits a beam. In this way, with the cooperation of the information processing device 52 and the image processing device 53, the imaging device 5 can conveniently and accurately determine the rotational position of the detection device 2 each time the radioactive source device 1 emits a beam and generate a CT image with less deformation or even without deformation. Moreover, since the detection data and the rotational position of the detection device 2 each time the radioactive source device 1 emits a beam are determined by the information processing device 52, but not by the image processing device 53, the structure of the image processing device 53 is relatively simple, and there is no need to make excessive modifications with the existing Image processing device 53, thereby facilitating saving the cost and lessening the improvement difficulty.

Moreover, the information processing device 52 may be further configured to obtain the beam emitting information of the radioactive source device 1, and determine the rotational position of the detection device 2 each time the radioactive source device 1 emits a beam based on the signal transmitted by the rotation monitoring device 4, the detection data of the detection device 2, and the beam emitting information of the radioactive source device 1. Based on this, the imaging device 5 not only is capable of obtaining the signal transmitted by the rotation monitoring device 4 as well as the detection data of the detection device 2, but also is capable of obtaining the beam emitting information of the radioactive source device 1 at the same time. Since whether the data obtained by the detection device is the effective detection data (i.e. the corresponding detection data when the radioactive source device 1 actually emits a beam) can be determined according to whether the radioactive source device 1 emits a beam, this setting facilitates the imaging device 5 to determine the detection data each time the radioactive source device 1 emits a beam, which further facilitates the imaging device 5 to determine the rotational position of the detection device 2 each time the radioactive source device 1 emits a beam based on the combination of the signal transmitted by the rotation monitoring device 4 and the detection data of the detection device 2.

In the present disclosure, in order to facilitate the detection device 2 to obtain the detection data at a frequency that is N times the beam emitting frequency, that is, in order to enable the data obtaining frequency of the detection device 2 is N times the beam emitting frequency of the radioactive source device 1, the CT inspection system may further comprise a frequency multiplying device 51 for multiplying the beam emitting frequency of the radioactive source device 1 by N times, and the detection device 2 obtains the detection data at the frequency multiplied by the frequency multiplying device 51. Based on the frequency multiplying device 51 which is configured to multiply the beam emitting frequency and transmit the multiplied beam emitting frequency to the detection device 2, N groups of detection data can be conveniently obtained by the detection device 2 each time the radioactive source device 1 emits a beam, thus increasing the amount of the detection data and improving the determination accuracy of the actual position of the detection device 2 each time the radioactive source device 1 emits a beam; furthermore, no excessive modifications need to be made on the existing structure of the detection device 2, thus, compared with the case that the detection device 2 is made to obtain the detection data at a frequency that is N times the beam emitting frequency by modifying the structure of the detection device 2 itself, it is less difficult to implement.

The present disclosure will be further described below in combination with the embodiment shown in FIG. 1 and FIG. 2.

As shown in FIG. 1 and FIG. 2, the CT inspection system of this embodiment comprises a scanning device, an imaging device 5, a rotation monitoring device 4, a frequency multiplying device 51, and a support 3.

Wherein, the scanning device is configured to scan an object to be detected a, and the scanning device comprises a radioactive source device 1 and a detection device 2. The radioactive source device 1 is configured to generate X rays for penetrating through the object to be detected a. The detection device 2 is configured to receive X rays which penetrate the object to be detected a, and convert the received X rays into recordable electric signals (i. e., detection data) which can be used by the imaging device 5 to generate a CT image.

As shown in FIG. 1, the scanning device of the present embodiment is arranged on the support 3, and includes a radioactive source device 1 and a detection device 2. The support 3 is circular. The radioactive source device 1 and the detection device 2 are both arranged on the support 3, and the radioactive source device 1 and the detection device 2 are arranged opposite to each other, such that the detection device 2 can sufficiently receive X rays sent by the corresponding radioactive source device 1. A passage for the object a be detected exists in the middle space of the support 3. The object a to be detected passes through the middle of the circular ring, the radioactive source device 1 emits X rays to penetrate through the object to be detected a, and the X rays which penetrate through the object to be detected a are emitted to the detection device 2 opposite to the radioactive source device 1. Specifically, as can be seen from FIG. 1, in the present embodiment, the object to be detected a is a container. During each scanning, a tangent plane of the object to be detected a is disposed in the passage to be scanned by the scanning device. Each time the scanning of a tangent plane is finished, the object to be detected a is towed by a towing device of the CT inspection system to another position at which a next tangent plane is located in the passage, so as to finish scanning of the next tangent plane. Continue like this, until the whole object to be detected a is scanned.

The radioactive source device 1 may adopt an X-ray machine or an accelerator. In the present embodiment, an accelerator serves as the radioactive source device 1. The detection device 2 is implemented by a detector array structure. In addition, although FIG. 1 only shows a group of radioactive source devices 1 and detection devices 2, it should be understood that, the scanning device may include more than two groups of radioactive source devices 1 and detection devices 2.

As shown by the arrow of FIG. 1, in the present embodiment, the scanning device scans the object to be detected a while swinging in a reciprocating manner. Specifically, when the object to be detected a is scanned, the radioactive source device 1 starts from an initial position, and rotates clockwise to a destination position. In this clockwise rotation process, the radioactive source device 1 has been always emerging beams, until computed tomography of one tangent plane is completed. Afterwards, according to user's requirements, a towing device (not shown in the figures) tows the object to be detected a to the position of the next tangent plane. Then the radioactive source device 1 starts from the destination position and rotates anticlockwise to the initial position again. In this anticlockwise rotation process, the radioactive source device 1 has also been always emerging beams, so as to finish computed tomography of the next tangent plane.

In the reciprocating swing process of the radioactive source device 1, the detection device 2 also synchronously swings in a reciprocating manner, in this way, the position on the detection device 2 covered by the ray beams generated by the corresponding radioactive source device 1 can always remain unchanged, which is conducive to ensuring that the ray beams emitted by the radioactive source device 1 are received by the detection device 2, thereby smoothly realize the scanning function of the scanning device.

As acceleration exists in both the radioactive source device 1 and the detection device 2 during the above reciprocating swing process, for example, acceleration exists at the beginning of the swing, and deceleration exists at the end of the swing, therefore the scanning device in the present embodiment rotates at a non-uniform speed in each scanning process. In this case, if reconstructed according to traditional image collection solutions, the CT image generated by the Imaging device is deformed. Therefore, in order to enable the imaging device 5 to accurately reconstruct CT images and reduce Image deformation, in the present embodiment, a rotation monitoring device 4 and a frequency multiplying device 51 are added, and the imaging device 5 is Improved. With the cooperation of the rotation monitoring device 4, the frequency multiplying device 51 and the imaging device 5, the CT inspection system of the present embodiment can acquire the actual rational position of the detection device 2 each time the radioactive source device 1 emits a beam, and reconstruct CT images based on the detection data and the actual rational position of the detection device 2 (i.e., the data of the detection device 2), thereby reducing the image deformation.

The frequency multiplying device 51, the rotation monitoring device 4, and the imaging device 5 of this embodiment will be highlighted below.

The frequency multiplying device 51 is for multiplying the beam emitting frequency of the radioactive source device 1, and transmitting the multiplied beam emitting frequency to the detection device 2, so that the detection device 2 obtains the detection data according to the multiplied beam emitting frequency, and the amount of the detection data obtained by the detection device 2 each time when the radioactive source device 1 emits a beam is increased, thereby conveniently improving the determination accuracy of the actual position of the detection device 2 when a beam is emitted. Specifically, in this embodiment, the frequency multiplying device 51 may multiply the beam emitting pulse of the radioactive source device 1 by 100 times, in other words, in this embodiment, N is 100, so that each time the radioactive source device 1 emits a beam, the detection device 2 no longer obtains one group of detection data, but obtains 100 groups of detection data, which comprise one group of effective detection data when a beam is actually emitted by the radioactive source device 1 and 99 groups of ineffective detection data when a beam is not actually emitted by the corresponding radioactive source device 1. The amount of the detection data is 100 times that before the multiplication, so that the amount of the detection data is effectively increased.

In the scanning process, instead of considering the current rotational position and rotation speed of the detection device 2, the detection data is obtained by the detection device 2 directly based on the multiplied beam emitting frequency, all the detection data obtained at each multiplied beam emitting frequency is transmitted to the imaging device 5, and the detection data (i.e., effective detection data) and the rotational position of the detection device 2 each time the radioactive source device 1 emits a beam are determined by the imaging device 5, in this way, there is no need to make excessive modifications to the existing detection device 2, thereby making a low cost.

The rotation monitoring device 4 is for detecting a rotation angle of the detection device 2 and transmitting a signal to the imaging device 5 each time the detection device 2 rotates by a preset angle, so as to facilitate the imaging device 5 to determine the actual angular position of the detection device 2 each time the radioactive source device 1 emits a beam. As shown in FIG. 2, in this embodiment, the rotation monitoring device 4 comprises a position detecting device 41 and a rotation control device 42. Wherein, the position detecting device 41 is for detecting a rotation angle of the detection device 2 in a scanning process, and the rotation control device 42 transmits a signal to the imaging device 5 each time the detection device 2 rotates by the preset angle based on the detection result of the position detecting device 41.

In other embodiments, the signal transmitted to the imaging device 5 each time the detection device 2 rotates by the preset angle may not be sent by the rotation control device 42, but directly by the position detecting device 41, however, the advantages of utilizing the rotation control device 42 to transmit a signal to the imaging device 5 each time when the detection device 2 rotates by the preset angle in this embodiment lie in that, the structure of the position detecting device 41 can be simplified, the position detecting device 41 and the rotation control device 42 are more explicitly divided in labor, and the real-time angular position of the detection device 2 can be determined more efficiently based on the cooperation of the position detecting device 41 and the rotation control device 42.

Specifically, in this embodiment, the position detecting device 41 may be implemented by a rotational displacement sensor to detect a rotational displacement of the detection device 2 in real time and feed the detection result back to the rotation control device 42. Of course, the position detecting device 41 may also employ other sensors, even other detection members. The rotation control device 42 acquires the rotation angle of the detection device 2 detected by detection of the position detecting device 41, obtains the real-time rotational position of the detection device 2 after calculating, and transmits a Signal to the imaging device 5 each time the detection device 2 rotates by the preset angle. Wherein, the signal transmitted by the rotation control device 42 each time the detection device 2 rotates by the preset angle may be a high level signal, so that the imaging device 5 can judge the currently received rotation angle of the detection device 2 only by judging the number of the high level signals. In addition, the preset angle is set to 0.0001 in this embodiment, but it should be understood that the preset angle may be specifically adjusted according to actual requirements.

Moreover, the rotation control device 42 of this embodiment is further configured to coordinate and control the entire CT inspection system, for example, the rotation control device 42 may perform beam emitting control on the radioactive source device 1, or may control the rotational speed of the radioactive source device 1 and the detection device 2, the time sequence of imaging and the like.

The imaging device 5 is for obtaining the signals transmitted by the rotation monitoring device 4, data of the detection device 2, and the beam emitting information (such as whether the radioactive source device 1 emits a beam and the beam emitting frequency) of the radioactive source device 1, determining the detection data and the rotational position of the detection device 2 each time the radioactive source device 1 emits a beam by processing the obtained information, and reconstructing a CT image. As shown in FIG. 2, the imaging device 5 of this embodiment comprises an information processing device 52 and an Image processing device 53. Wherein, the information processing device 52 is configured to obtain the signal transmitted by the rotation monitoring device 4, all the detection data of the detection device 2, and the beam emitting information of the radioactive source device 1, determine the detection data and rotational position of the detection device 2 each time the radioactive source device 1 emits a beam based on the obtained signal, the obtained detection data and the obtained beam emitting information, and transmit the determined detection data and rotational position of the detection device 2 each time the radioactive source device 1 emits a beam to the image processing device 53; the image processing device 53 is configured to reconstruct a CT image based on the detection data and the rotational position of the detection device 2 transmitted by the information processing device 52 each time the radioactive source device 1.

Based on the obtained beam emitting information of the radioactive source device 1, the information processing device 52 can judge whether the radioactive source device 1 emits a beam, and can further distinguish the effective detection data and the ineffective detection data in the detection data obtained by the detection device 2. Moreover, based on the signal transmitted by the rotation monitoring device 4 and the amount of the detection data obtained by the detection device 2 between every two adjacent signals transmitted by the rotation monitoring device 4, the information processing device 52 can determine the degree of subdivision of each preset rotation angle by multiple groups of detection data between two adjacent level signals of the rotation monitoring device 4, so as to determine the respective rotation angle of the detection device 2 corresponding to each group of the detection data in the process that the detection device 2 rotates by the preset angle. Further, in combination with the data sequence at which the effective detection data determined by the information processing device 52 is in the plurality of detection data between two adjacent level signals of the rotation monitoring device 4, the rotational position of the detection device 2 when the effective detection data is obtained can be determined, which is convenient, efficient, and with high accuracy.

In order to more clearly show the principle that the information processing device 52 determines the rotational position of the detection device 2 when the effective detection data is obtained, description IS made here with the example in which the preset angle is 0.0001°, the amount of the detection data between two adjacent level signals of the rotation monitoring device 4 is 100 groups, and the effective detection data is the 30th group of data therein. Since the preset angle is 0.0001°, the detection device 2 rotates by 0.0001° correspondingly between every two adjacent level signals transmitted by the rotation monitoring device 4, and as the detection device 2 obtains 100 groups of detection data in total in this process, it may be considered that the 100 groups of detection data divide the 0.0001° evenly, that is, the rotation angel of the detection device 2 corresponding to each group of detection data may be considered to be 0.0001°/100, i.e., 0.000001°, then the rotation angel of the detection device 2 corresponding to the effective detection data which is the 30th group of data is 0.0001°/100*30, i.e., 0.00003°, thereby the rotational angular position of the detection device 2 when the effective detection data is acquired can be obtained by adding 0.00003° to the angle of the detection device 2 corresponding to the previous level signal in the two adjacent level signals, which is with high precision and relatively accurate.

As shown in FIG. 2, in the operation process of the CT inspection system, the radioactive source device 1 emits rays according to the beam emitting frequency which is multiplied by the frequency multiplying device 51, and the information such as whether the radioactive source device 1 emits a beam is transmitted to the information processing device 52 in real time. Moreover, the detection device 2 obtains the detection data based on the multiplied beam emitting pulse by the frequency multiplying device 51, and transmits all the detection data to the information processing device 52. At the same time, the position detecting device 41 detects the position of the detection device 2 in real time, and based on the detection result of the position detecting device 41, the rotation control device 42 performs coordination and control on the entire CT system, including rotation control of the radioactive source device 1 and the detection device 2, beam emitting control of the radioactive source device 1, time sequence control of image acquisition and the like. Moreover, the rotation control device 42 transmits a level signal to the information processing device 52 each time the detection device 2 rotates by the preset angle of 0. 0001°. After receiving the beam emitting information of the radioactive source device 1, the detection data of the detection device 2 and the level signal of the rotation monitoring device 4, the information processing device 52 determines the effective detection data of the detection device 2 and the rotational position at which the detection device 2 is located when the effective detection data is obtained, and sends the effective detection data of the detection device 2 as well as the rotational position at which the detection device 2 is located when the effective detection data is obtained to the image processing device 53. The image processing device 53 then generates a CT image based on the effective detection data and the corresponding rotational position of the detection device 2.

Under the cooperation of the frequency multiplying device 51, the rotation monitoring device 4 and the information processing device 52, the information processing device 52 can determine with higher precision the rotational position of the detection device 2 when the effective detection data is obtained, and match the effective detection data and the corresponding actual position of the detection device 2 more accurately, so that the image processing device 53 is no longer affected by the non-uniform rotational scanning process or restricted by the detection accuracy of the rotation monitoring device 4, but can generate images with less or no deformation, therefore, the deformation problem of a reconstructed CT image in the non-uniform rotational scanning process can be effectively solved.

Moreover, since the information processing device 52 only sends to the image processing device 53 the determined effective detection data of the detection device 2 and the determined position of the detection device 2 when the effective detection data is obtained, rather than transmitting all the detection data to the image processing device 53, the amount of data processed by the image processing device 53 is effectively reduced, the image generation efficiency is accelerated, and the image generation reliability is improved.

In summary, the CT inspection system of the present disclosure can effectively solve the deformation problem of a reconstructed CT image in non-uniform rotational scanning process in the prior art with a simple structure and a low improvement cost.

When the CT inspection system of the present disclosure is used for detection, the detection accuracy is higher, and the identification of the detection result is better. Accordingly, another aspect of the present disclosure provides a CT imaging method, comprising the steps as follows:

scanning an object a to be inspected by a radioactive source device 1 and a detection device 2 of a scanning device, wherein the radioactive source device 1 and the detection device 2 synchronously rotate at a non-uniform speed in at least partial scanning process, and the detection device 2 obtains detection data at a frequency that is N times a beam emitting frequency of the radioactive source device 1, wherein N is greater than or equal to 2;

detecting a rotation angle of the detection device 2 by a rotation monitoring device 4, and transmitting a signal to an Imaging device each time the detection device 2 rotates by a preset angle by the rotation monitoring device 4; and determining rotational position of the detection device 2 by the imaging device 5 each time the radioactive source device 1 emits a beam according to the signals transmitted by the rotation monitoring device 4 and the detection data of the detection device 2, and generating a CT image by the imaging device 5 based on the detection data and the rotational position of the detection device 2 each time the radioactive source device 1 emits a beam.

For the non-uniform rotational scanning process, based on the rotation angle detected by the rotation monitoring device 4 and more detection data obtained by the detection device 2 at multiplied beam emitting frequency, the CT imaging method of the present disclosure is capable of more accurately determining the rotational position of the detection device 2 each time the radioactive source device 1 emits a beam, so that the detection data and the rotation position of the detection device 2 can correspond to each other more truthfully each time the radiation source device 1 emits a beam, therefor effectively reducing the image deformation and improving the detection accuracy.

The foregoing descriptions are only the exemplary embodiments of the present disclosure, but do not serve to limit the present disclosure. Any amendment, equivalent replacement, improvement, and the like made within the spirit and principles of the present disclosure should all be contained within the protection scope of the present disclosure.

What is claimed is:

1. A CT imaging method, comprising the steps as follows:
    scanning an object to be inspected by a radioactive source device and a detection device of a scanning device,
    wherein the radioactive source device and the detection device synchronously rotate at a non-uniform speed in at least a partial scanning process, and the detection device obtains detection data at a frequency that is N times a beam emitting frequency of the radioactive source device, wherein N is greater than or equal to 2;
    detecting a rotation angle of the detection device by a rotation monitoring device, and transmitting a signal to an imaging device each time the detection device rotates by a preset angle by the rotation monitoring device; and
    determining a rotational position of the detection device by the imaging device each time the radioactive source device emits a beam according to the signal transmitted by the rotation monitoring device and the detection data of the detection device, and generating a CT image by the imaging device based on the detection data and the rotational position of the detection device each time the radioactive source device emits a beam.

2. The CT imaging method according to claim 1, wherein determining a rotational position of the detection device by the imaging device each time the radioactive source device emits a beam according to the signal transmitted by the rotation monitoring device and the detection data of the detection device comprises:
    determining the rotational position of the detection device by the imaging device each time the radioactive source device emits a beam based on the signal transmitted by the rotation monitoring device, the detection data of the detection device, and beam emitting information of the radioactive source device.

3. The CT imaging method according to claim 1, wherein determining a rotational position of the detection device by the imaging device each time the radioactive source device emits a beam according to the signal transmitted by the rotation monitoring device and the detection data of the detection device, and generating a CT image by the imaging device based on the detection data and the rotational position of the detection device each time the radioactive source device emits a beam comprises:
    receiving the signal transmitted by the rotation monitoring device and the detection data of the detection device by an information processing device of the imaging device;
    determining a rotational position of the detection device by the information processing device each time the radioactive source device emits a beam based on the signal transmitted by the rotation monitoring device and the detection data of the detection device; and
    generating a CT image by an image processing device of the imaging device based on the detection data and the rotational position of the detection device each time the radioactive source device emits a beam.

4. The CT imaging method according to claim 3, further comprising:
    obtaining beam emitting information of the radioactive source device by the information processing device;
    wherein determining a rotational position of the detection device by the information processing device each time the radioactive source device emits a beam based on the signal transmitted by the rotation monitoring device and the detection data of the detection device comprises:
    determining the rotational position of the detection device by the information processing device each time the radioactive source device emits a beam based on the signal transmitted by the rotation monitoring device, the detection data of the detection device, and the beam emitting information of the radioactive source device.

5. The CT imaging method according to claim 1, wherein determining a rotational position of the detection device by the imaging device each time the radioactive source device emits a beam according to the signal transmitted by the rotation monitoring device and the detection data of the detection device comprises:
    determining the rotational position of the detection device by the imaging device each time the radioactive source device emits a beam according to the detection data of the detection device between every two adjacent signals transmitted by the rotation monitoring device.

6. The CT imaging method according to claim 1, further comprising:
    multiplying the beam emitting frequency of the radioactive source device by N times by a frequency multiplying device; and
    obtaining the detection data by the detection device based on a frequency multiplied by the frequency multiplying device, so that obtaining the detection data by the detection device at a frequency that is N times the beam emitting frequency of the radioactive source device.

7. The CT imaging method according to claim 1, wherein detecting a rotation angle of the detection device by a rotation monitoring device, and transmitting a signal to an imaging device each time the detection device rotates by a preset angle by the rotation monitoring device comprises:
    detecting a rotation angle of the detection device in a scanning process by a position detecting device of the rotation monitoring device; and
    transmitting a signal by the rotation monitoring device to the imaging device each time the detection device rotates by the preset angle according to a detection result of the position detecting device.

8. The CT imaging method according to claim 7, wherein transmitting a signal by the rotation monitoring device to the imaging device each time the detection device rotates by the preset angle according to a detection result of the position detecting device comprises:
   transmitting a signal by a rotation control device of the rotation monitoring device to the imaging device each time the detection device rotates by the preset angle according to the detection result of the position detecting device.

9. The CT imaging method according to claim 8, further comprising:
   controlling at least one of rotational speeds of the radioactive source device and the detection device, and beam emitting of the radioactive source device by the rotation control device.

\* \* \* \* \*